Sept. 1, 1970 P. SPRANG 3,526,464

PNEUMATIC MOTOR UNIT FOR MACHINE TOOLS

Filed July 5, 1968

United States Patent Office 3,526,464
Patented Sept. 1, 1970

3,526,464
PNEUMATIC MOTOR UNIT FOR MACHINE TOOLS
Peter Sprang, Munich, Germany, assignor to Friedrich Deckel Prazisions Mechanik und Maschinenbau, Munich, Germany, a firm of Germany
Filed July 5, 1968, Ser. No. 742,934
Claims priority, application Austria, July 19, 1967, A 6,727/67
Int. Cl. F01d *15/06, 25/16*
U.S. Cl. 415—126        9 Claims

ABSTRACT OF THE DISCLOSURE

A pneumatic motor unit, adjustable radially with respect to the axis of the spindle head on which it is mounted, comprises a hollow hub in which the tool spindle of the unit is rotatably supported. A pneumatic turbine rotor is on the spindle below the end of the hub. The hub and rotor are surrounded by a hollow housing rotatable with respect to the hub. A cap on the housing forms, in conjunction with the housing, an annular air passage surrounding the rotor, and nozzles direct compressed air from this annular passage onto the blades of the rotor.

BACKGROUND OF THE INVENTION

Planetary grinding units for use on machine tools are well known. Frequently the planetary unit is driven by an electric motor. A satisfactory form of electrically driven unit is disclosed in Ostler Pat. 3,024,376, granted Mar. 6, 1962 (class 310–71). It has also been proposed to drive the planetary spindle pneumatically rather than electrically; see for example Pat. 2,608,807. However, the known forms of pneumatically driven units are not wholly satisfactory because of the difficulties of providing a sufficiently air tight seal, or a sufficiently good bearing for the spindle.

The present invention overcomes the previous difficulties and provides a pneumatically driven construction in which, on the one hand, the spindle has good firm bearings, and on the other hand, it is not necessary to seal the hub relative to the surrounding housing to prevent unwanted escape of compressed air.

An object of the present invention is to provide a generally improved and more satisfactory pneumatic motor unit for machine tools, especially for planetary grinding.

Another object of the invention is the provision of a unit so designed as to eliminate previous difficulties both with respect to the sealing of the compressed air supply and with respect to providing adequate and efficient bearing for the pneumatically driven spindle.

BRIEF DESCRIPTION OF THE DRAWING

In the accompanying drawing, incorporated herein by reference and forming a material part of the present disclosure.

DESCRIPTION OF THE PREFERRED EMBODIMENT

Figure 1:
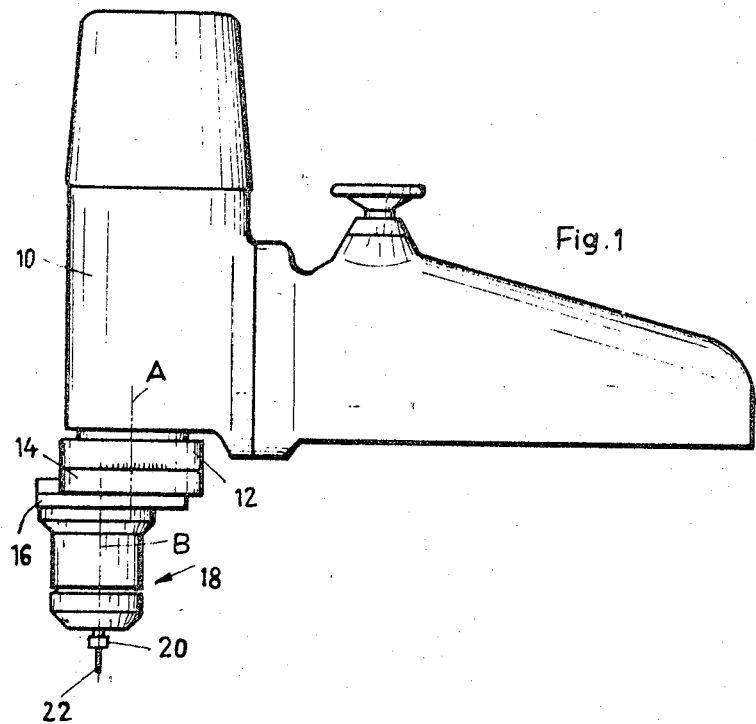
FIG. 1 is a side elevation of a grinding head for a machine tool, with an attached pneumatically driven planetary grinding unit in accordance with a preferred embodiment of the present invention.

Referring first to FIG. 1, there is shown at 10 a side elevation of a typical conventional form of grinding head commonly used on a coordinate milling machine. The grinding head itself is well known in the art and need not be further described; compare, for example, with FIG. 1 of the above mentioned Pat. 3,024,376. It is only the planetary grinding unit mounted on this head with which the present invention is concerned.

The conventional grinding head may be adjusted to a variety of different positions, as well understood in the art. Merely for convenience of description, it will be assumed that the head is adjusted to a position where the conventional tool spindle of the head rotates about a vertical axis indicated schematically at A. Mounted on and rotating with this tool spindle in the head 10 is a flange 12 provided on its lower face with a dovetailed guide 14.

The pneumatic motor unit of the present invention comprises an end plate or top plate 16 having a dovetailed guide which fits into and slides horizontally along the dovetailed guide 14, being clamped in any desired position thereon by conventional clamping means. The rest of the pneumatic motor unit, indicated in general at 18, is supported from and projects downwardly from the plate 16. The unit includes a planetary spindle rotatable about the axis indicated at B, this spindle having a chuck 20 in which a grinding tool 22 may be mounted. By sliding the plate 16 along the dovetailed guide 14, the planetary axis B may be made coaxial with the axis A, or may be offset therefrom to any desired degree within the capacity of the machine.

Figure 2:
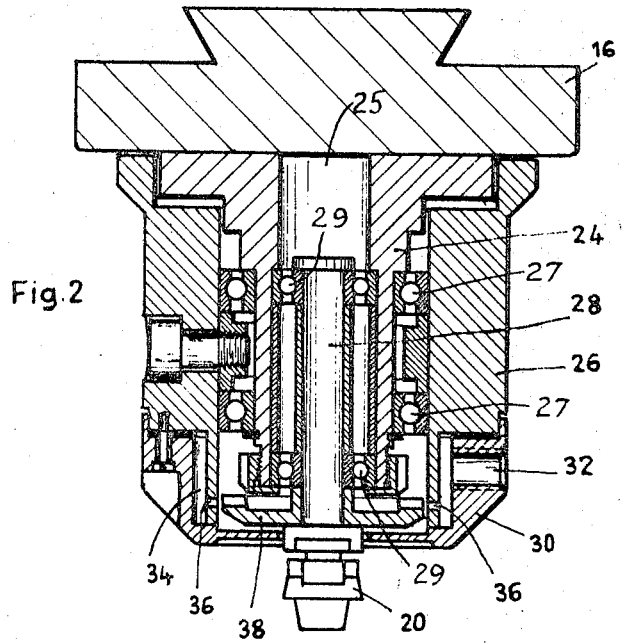
FIG. 2 is a vertical section taken axially and diametrically through a pneumatic motor unit constructed in accordance with a preferred embodiment of the invention.

The construction includes a downwardly projecting hub 24 (FIG. 2) fixed securely to the plate 16, and having a central bore 25. There is a hollow housing 26 surrounding the hub 24 and rotatably mounted thereon by means of ball bearings 27, so that the hub 24 can rotate freely within the housing 26 when the flange 12, plate 16, and hub 24 rotate about the axis A.

The planetary grinding spindle shaft 28 extends axially within the bore 25 of the hub 24, and is rotatably mounted therein by means of two ball bearings 29 spaced axially from each other through a substantial distance, to provide a good firm bearing for the shaft 28 on the hub 24. The lower one of these two ball bearings 29 is substantially at the lower end of the hub 24. Just below the lower end of the hub, the shaft 28 is provided with the pneumatic turbine rotor 38. Below the rotor 38, the shaft 28 has the previously mentioned chuck 20, of conventional form, in which any conventional grinding tool 22 may be mounted.

The hollow housing 26 is closed at the bottom by a cap member 30 screwed thereon. The cap member 30 has a bore 32 in its side wall, for connection with a conventional compressed air supply line, such as a hose. The cooperating walls of the housing 26 and cap 30 are shaped to provide an annular channel or chamber 34 between these two parts, in communication with the inlet opening 32. At a point opposite the vanes or blades of the turbine rotor 38, the wall of the housing 26 has several nozzles 36 through which air may flow from the passageway 34, to impinge upon the rotor blades, to drive the rotor 38 and its shaft 28 and the grinding tool 22.

It will be noted that in this construction there is no problem of having to seal the housing 26 tightly with respect to the hub 24 rotating within the housing. The compressed air coming in through the inlet bore 32 is confined within the annular chamber 34 (except for its intended escape through the nozzles 36, of course) and this chamber 34 is formed entirely between the parts 26 and 30, which are stationary with respect to each other, thus needing no pneumatic seal between relatively movable parts. Moreover, it may be noted that the spindle or shaft 28 is adequately supported by the bearings 29, which can be spaced axially from each other by a considerable distance in order to provide adequate firm bearing for the shaft. Furthermore, it should be noted that both of these spaced bearings 29 are mounted on the same part, namely, the hub 24, thus eliminating the added difficulties which would arise if one of the bearings were mounted on the hub 24 and the other bearing were mounted on a part movable with respect to the hub, such as the housing 26.

What is claimed is:

1. A pneumatic planetary motor unit for machine tools, comprising a base adapted to be mounted on and to be adjustable radially with respect to a rotatable tool head, a hub rigidly secured to and projecting from said base, said hub having a central bore, a hollow housing structure surrounding said hub and rotatable relative thereto, a spindle shaft having a portion extending axially within said bore in said hub, axially spaced bearing means rotatably journalling said spindle shaft within said bore, a rotor mounted on said shaft axially outward of said hub, means including said housing structure enclosing said rotor, and means including nozzle means on said housing structure for directing compressed air against said rotor to drive said rotor.

2. A construction as defined in claim 1, wherein said housing structure is supported from said hub.

3. A construction as defined in claim 1, wherein said housing structure comprises a housing member of generally cylindrical shape and a cap member partially closing one end of said housing member.

4. A construction as defined in claim 1, wherein said housing structure comprises a housing member and a cap member, and further including connection means on one of said members for connection to a compressed air supply.

5. A construction as defined in claim 1, wherein said housing structure comprises a housing member and a cap member, said members having wall portions radially spaced from each other to define an annular chamber between them, for containing compressed air.

6. A construction as defined in claim 5, wherein said nozzle means includes nozzle openings extending from said annular chamber through one of said members, and further including connection means on one of said members for connection to a compressed air supply for supplying compressed air to said annular chamber.

7. A construction as defined in claim 6, wherein said nozzle openings extend through said housing member and said connection means is on said cap member.

8. A pneumatic motor unit for a planetary grinding spindle mounted in eccentric relation to a rotatable tool head, said motor unit comprising a base mounted on and rotating bodily with said rotatable tool head and adjustable radially with respect to said tool head to various positions of eccentricity with respect thereto, a tubular hub rigidly fixed to and projecting from said base, said hub having a central bore, a grinding spindle having a substantial length within said bore and projecting therefrom at one end, a plurality of spindle bearings spaced from each other axially of said spindle, a pneumatic turbine rotor fixed to the projecting end of said spindle beyond the end of said bore, a housing structure surrounding said hub and said rotor and mounted for rotation on said hub coaxially with said spindle and its rotor, so that said housing structure may remain in an approximately constant direction of orientation while said hub revolves within it as a result of rotation of said tool head, said housing structure having a series of nozzles through which compressed air may be discharged to impinge upon and drive said rotor, a compressed air inlet opening, and a distribution chamber for distributing compressed air from said inlet opening to said nozzles, said motor unit being particularly characterized by the features that:

(a) all of said spindle bearings are mounted on and supported by said hub; and
(b) said air distribution chamber is formed entirely within said housing structure.

9. A motor unit as defined in claim 8, in which said housing structure comprises a housing member and a cap member, and in which said air distribution chamber is formed between a wall of said housing member and a spaced wall of said cap member.

References Cited

UNITED STATES PATENTS

| | | | |
|---|---|---|---|
| 2,733,551 | 2/1956 | Baldyga | 253—2 X |
| 2,828,938 | 4/1958 | Roesch et al. | 253—2 |
| 2,927,768 | 3/1960 | Gluchowicz | 253—2 |

FOREIGN PATENTS

| | | |
|---|---|---|
| 117,544 | 4/1947 | Sweden. |

EVERETTE A. POWELL, Jr., Primary Examiner

U.S. Cl. X. R.

415—503